(12) United States Patent
Morris et al.

(10) Patent No.: US 7,623,783 B2
(45) Date of Patent: Nov. 24, 2009

(54) SYSTEM AND METHOD OF SELF-CONFIGURING OPTICAL COMMUNICATION CHANNELS BETWEEN ARRAYS OF EMITTERS AND DETECTORS

(75) Inventors: Terrel L. Morris, Garland, TX (US); David Martin Fenwick, Chelmsford, MA (US); Ricahrd John Luebs, Windsor, CO (US); Duane A. Wegher, Ft. Collins, CO (US); Jeffry D. Yetter, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 640 days.

(21) Appl. No.: 10/915,052

(22) Filed: Aug. 10, 2004

(65) Prior Publication Data

US 2006/0034609 A1   Feb. 16, 2006

(51) Int. Cl.
    *H04B 10/10* (2006.01)
(52) U.S. Cl. .......................... 398/25; 398/131
(58) Field of Classification Search .................. 398/25, 398/131
    See application file for complete search history.

(56) References Cited

U.S. PATENT DOCUMENTS

| 4,545,074 A | 10/1985 | Balliet et al. |
| 4,568,931 A | 2/1986 | Biolley et al. |
| 5,023,863 A | 6/1991 | Masuda |
| 5,123,073 A | 6/1992 | Pimpinella |
| 5,218,654 A | 6/1993 | Sauter |
| 5,245,680 A | 9/1993 | Sauter |
| 5,420,954 A | 5/1995 | Swirhun et al. |
| 5,430,442 A | 7/1995 | Kaiser et al. |
| 5,465,379 A | 11/1995 | Li et al. |

(Continued)

FOREIGN PATENT DOCUMENTS

EP    311 772    4/1989

(Continued)

OTHER PUBLICATIONS

Weik, Martin A. "bit error rate," "bit eror ratio," "bit error ratio tester." Fiber Optics Standard Dictionary. 3rd ed. 1997.*

(Continued)

*Primary Examiner*—Leslie Pascal

(57) ABSTRACT

A system for self-configuring optical communication channels between arrays of emitters and detectors comprises: an array of light emitters; an array of light detectors roughly aligned with the array of light emitters; and self-configuration logic for controlling the light emitters of the emitter array to transmit optical data to the array of light detectors and for monitoring received optical data of the light detectors of the detector array to establish light emitter/detector optical channels between the arrays of light emitters and light detectors based on optical data transmission error rates. In addition, a method of self-configuring optical communication channels between arrays of emitters and detectors comprises the steps of: roughly aligning an array of light emitters to an array of light detectors; controlling the light emitters of the emitter array to transmit optical data to the array of light detectors; and monitoring received optical data of the light detectors of the detector array to establish light emitter/detector optical channels between the arrays of light emitters and light detectors based on optical data transmission error rates.

22 Claims, 5 Drawing Sheets

U.S. PATENT DOCUMENTS

| | | | |
|---|---|---|---|
| 5,477,363 | A | 12/1995 | Matsuda |
| 5,497,465 | A | 3/1996 | Chin et al. |
| 5,515,195 | A | 5/1996 | McAdams |
| 5,600,748 | A | 2/1997 | Kosaka |
| 5,623,497 | A * | 4/1997 | Shimawaki et al. .......... 714/704 |
| 5,631,988 | A | 5/1997 | Swirhun et al. |
| 5,764,834 | A | 6/1998 | Hultermans |
| 5,920,664 | A | 7/1999 | Hirabayashi et al. |
| 6,185,648 | B1 | 2/2001 | Munoz-Bustamante |
| 6,334,784 | B1 | 1/2002 | Howard |
| 6,363,182 | B2 | 3/2002 | Mills et al. |
| 6,379,053 | B1 | 4/2002 | van Doorn |
| 6,430,335 | B1 | 8/2002 | Carberry et al. |
| 6,509,992 | B1 | 1/2003 | Goodwill |
| 6,527,456 | B1 | 3/2003 | Trezza |
| 6,580,865 | B1 | 6/2003 | Doorn |
| 6,583,445 | B1 | 6/2003 | Reedy et al. |
| 6,583,904 | B1 | 6/2003 | Mahlab et al. |
| 6,587,605 | B2 | 7/2003 | Paniccia et al. |
| 6,588,943 | B1 | 7/2003 | Howard |
| 6,603,899 | B1 | 8/2003 | Popp et al. |
| 6,628,860 | B1 | 9/2003 | Van Doorn |
| 6,634,812 | B2 | 10/2003 | Ozeki et al. |
| 6,651,139 | B1 | 11/2003 | Ozeki et al. |
| 6,661,940 | B2 | 12/2003 | Kim |
| 6,674,971 | B1 | 1/2004 | Boggess et al. |
| 6,763,157 | B1 * | 7/2004 | Williams et al. .............. 385/15 |
| 6,983,403 | B2 * | 1/2006 | Mayweather et al. ....... 714/704 |
| 2001/0030782 | A1 * | 10/2001 | Trezza ........................ 359/110 |
| 2002/0149825 | A1 | 10/2002 | Levy et al. |
| 2002/0178319 | A1 | 11/2002 | Sanchez-Olea |
| 2003/0081281 | A1 | 5/2003 | DeCusatis et al. |

FOREIGN PATENT DOCUMENTS

| | | |
|---|---|---|
| EP | 0311772 | 4/1989 |
| EP | 351 729 | 1/1990 |
| EP | 367 460 | 5/1990 |
| EP | 811 862 | 12/1997 |
| EP | 868 049 | 9/1998 |
| EP | 1 180 912 | 2/2002 |

OTHER PUBLICATIONS

Baukens, V. et al. "Free-space optical interconnection modules for two-dimensional photonic very large scale integration circuitry based on microlenses and gradient-refractive-index lenses." Optical Engineering, vol. 40, No. 11, Nov. 2001: 2431-2441.*
U.S. Appl. No. 10/915,613 Response to Restriction filed Jul. 31, 2006.
U.S. Appl. No. 10/915,613 Office Action mailed Sep. 6, 2006.
U.S. Appl. No. 10/915,613 Amendment filed Nov. 17, 2006.
U.S. Appl. No. 10/915,613 Office Action mailed Dec. 11, 2006.
U.S. Appl. No. 10/915,613 Amendment filed Feb 5, 2007.
U.S. Appl. No. 10/915,613 Advisory Action mailed Apr. 18, 2007.
U.S. Appl. No. 10/915,613 Applicant's Interview Summary filed May 11, 2007.
U.S. Appl. No. 10/915,613 Examiner's Interview Summary filed May 14, 2007.
U.S. Appl. No. 10/915,613 Notice of Allowance.
B. Robertson, et al., "Design and Operation of an in situ Microchannel Alighment-Detection System", Applied Optics, vol. 37, No. 23, Aug. 10, 1998, p. 5368-5376.
B. Robertson, "Design of an Optical Interconnect for Photonic Backplane Applications", Applied Optics, vol. 37, No. 14, May 10, 1998, p. 2974-2984.
M. Jonsson, et al. "Optical Interconnection Technology in Switches, Routers and Optical Cross Connects", Ericsson Report, p. 1-43, Oct. 2000.
R. Sims, "Scaling Laws for MEMS Mirror-Rotation Optical Cross Connect Switches", Journal of Lightwave Technology, vol. 20, No. 7, Jul. 2002, p. 1084-1094.
F. Tooley, "Challenges in Optically Interconnecting Electronics", IEEE Journal of Selected Topics in Quantum Electronics, vol. 2, No. 1, Apr. 1996, p. 3-13.

* cited by examiner

SYSTEM AND METHOD OF SELF-CONFIGURING OPTICAL COMMUNICATION CHANNELS BETWEEN ARRAYS OF EMITTERS AND DETECTORS

CROSS REFERENCES TO RELATED APPLICATIONS

This patent application is related to U.S. patent application Ser. Nos. 10/980,595, 10/980,591, and 10/980,746 which is now U.S. Pat. No. 7,118,285, all filed on Nov. 3, 2004, and titled "Optical Connections and Methods of Forming Optical Connections." Other U.S. patent applications that may have related subject matter include the following: U.S. patent application Ser. No. 10/945,007 entitled "Apparatus and Method of Providing an Optical Connection between PC Boards for Optical Communication," now U.S. Pat. No. 7,229,218 having at least one common inventor with this application; U.S. patent application Ser. No. 10/915,612 entitled "System and Method of Configuring Fiber Optic Communication Channels between Arrays of Emitters and Detectors" having at least one common inventor with this application; U.S. patent application Ser. No. 10/915,641, now U.S. Pat. No. 7,251,388 entitled "Apparatus For Providing Optical Communication Between Integrated Circuits Of Different PC Boards And An Integrated Circuit Assembly For Use Therein," having at least one common inventor with this application; U.S. patent application Ser. No. 10/980,521 entitled "Optical Bus System," having at least one common inventor with this application; U.S. patent application Ser. No. 10/936,874 entitled "Apparatus And Method Of Establishing Optical Communication Channels Between A Steerable Array Of Laser Emitters And An Array Of Optical Detectors," having at least one common inventor with this application; U.S. patent application Ser. No. 10/898,834 entitled "Apparatus And Method Of Providing Separate Control And Data Channels Between Arrays Of Light Emitters And Detectors For Optical Communication And Alignment," having at least one common inventor with this application; U.S. patent application Ser. No. 10/979,989 entitled "Optical Connections And Methods Of Forming Optical Connections," having at least one common inventor with this application; and U.S. patent application Ser. No. 10/915,613 entitled "System And Method Of Configuring Fiber Optic Communication Channels Between Arrays Of Emitters And Detectors," having at least one common inventor with this application and now U.S. Pat. No. 7,269,321.

BACKGROUND OF THE INVENTION

The present invention relates to optical communication systems, in general, and more particularly to a system and method of self-configuring optical communication channels between arrays of emitters and detectors.

Greater demands for increased bandwidth are being made on data communication between electrical data processing units or subunits, like printed circuit (PC) boards, for example. Communication rates of tens of gigabits per second are exemplary of such demands. These demands can not be met by traditional metal electrical connections, like those found on mother boards and back plane connections, for example. One solution to meet these demands is to create optical communication channels for board-to-board communication using a light coupling between an array of light emitters connected to one PC board and an array of light detectors connected to another PC board.

A drawback to this solution is that each light emitter must be precisely aligned with a corresponding light detector to form optical communication channels between the PC board arrays. This precise alignment is no simple task and generally requires additional equipment and man-hours to achieve. In addition, once the precise alignment is initially achieved, it may have to be repeated from time to time, due to misalignment due to such effects as shock, vibration, temperature changes and the like, for example.

The present invention overcomes the drawbacks of forming the light coupling channels to provide a self-configuration of optical communication channels between arrays of light emitters and detectors without initial precise alignment and including a method for dynamic reconfiguration.

SUMMARY

In accordance with one aspect of the present invention, a system for self-configuring optical communication channels between arrays of emitters and detectors comprises: an array of light emitters; an array of light detectors roughly aligned with the array of light emitters; and self-configuration logic for controlling the light emitters of the emitter array to transmit optical data to the array of light detectors and for monitoring received optical data of the light detectors of the detector array to establish light emitter/detector optical channels between the arrays of light emitters and light detectors based on optical data transmission error rates.

In accordance with another aspect of the present invention, a method of self-configuring optical communication channels between arrays of emitters and detectors comprises the steps of: roughly aligning an array of light emitters to an array of light detectors; controlling the light emitters of the emitter array to transmit optical data to the array of light detectors; and monitoring received optical data of the light detectors of the detector array to establish light emitter/detector optical channels between the arrays of light emitters and light detectors based on optical data transmission error rates.

DETAILED DESCRIPTION OF THE INVENTION

Figure 1:
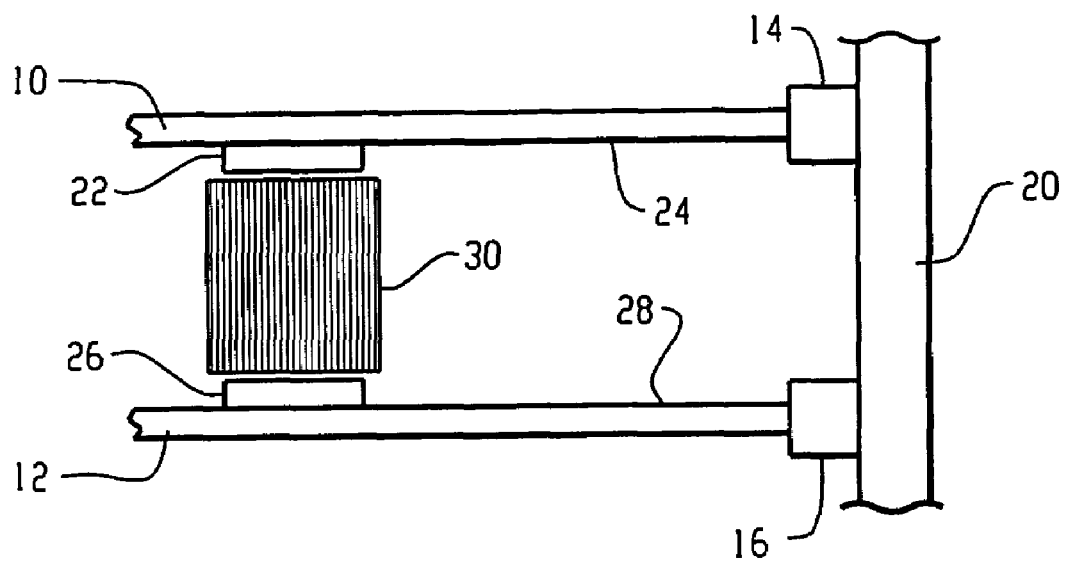
FIG. 1 is an illustration of an exemplary data processing system embodiment suitable for application of the present invention.

FIG. 1 is an illustration of an exemplary data processing system embodiment suitable for application of the present invention. Referring to FIG. 1, at least two PC boards 10 and 12, which are considered data processing subunits of the processing system, are connected through suitable electrical connectors 14 and 16, respectively, to a mother board or back plane electrical assembly 20. In the present embodiment, the PC boards 10 and 12 are stacked in parallel arrangement with board 10 on top of board 12. However, it is understood that an arrangement of boards in parallel side by side will function just as well. An array of electro-optic elements 22, like light emitters, for example, are disposed at a side 24 of board 10 and connected electrically to circuitry of PC board 10. Likewise, an array of opto-electric elements 26, like light detectors, for example, are disposed on a side 28 of board 12 that faces side 24 of board 10 and connected electrically to circuitry of PC board 12. The light emitters of array 22 may emit either coherent light (i.e. from a laser diode) or non-coherent light (i.e. from an light emitting diode or other similar source).

It is understood that the arrays 22 and 26 may be designed with many different shapes and configurations without deviating from the broad principles of the present invention. In the present embodiment, the arrays are rectangular in shape and configured in rows and columns, like that shown by way of example for the light emitting array 22 in FIG. 3 in which the darkened circles designate the light emitters, and for the light detecting array 26 in FIG. 4 in which the open circles designate the light detectors.

Referring back to FIG. 1, disposed between the arrays 22 and 26 is a bundle of optical fibers 30 which conducts light emitted from the emitters of array 22 to the detectors of array 26. The optical fibers may be either plastic or multi-mode glass fibers, for example. The optical fiber bundle 30 may be roughly aligned with and coupled to the array 22 at one end and the array 26 at the other end by suitable optical connectors. Note that a light beam of an emitter of the array 22 may be conducted through more than one optical fiber of the bundle 30 and be received by more than one of the detectors of the array 26. Typically, the optical fibers used to form the bundle 30 have an outer cladding diameter ranging from 62.5 µm to 125 µm, for example, and the emitters and detectors may be placed on centers as tight as 25-40 µm. Accordingly, a 32×32 array of optical fibers would be approximately 0.315 square inches. Thus, the optical bundle 30 shown in FIG. 1 may be actually less than one-half its illustrated thickness.

Figure 5:
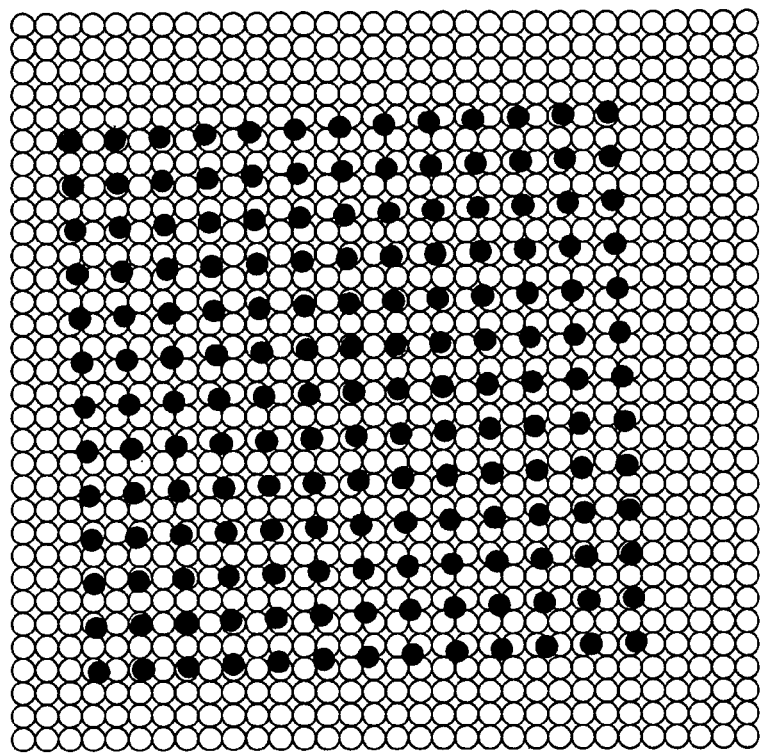
FIG. 5 is an illustration of a rough alignment of exemplary arrays of emitters and detectors.

Accordingly, in the present embodiment, each optical fiber of the bundle 30 does not have to be precisely aligned with the a corresponding light emitter/detector pair of the arrays 22 and 26, but rather the bundle of optical fibers 30 may be aligned roughly between the arrays 22 and 26 so that the light from the array of emitters 22 as shown by the darkened circles (FIG. 5) is conducted by the fiber optic bundle 30 and received by the array of detectors 26 as shown by the clear circles (FIG. 5). Then, fiber optic communication channels may be self-configured by mapping emitters of array 22 to detectors of array 26 which will be described in greater detail herein below in connection with the embodiment depicted by the block diagram schematic of FIG. 6.

Note that while the present embodiment uses a rectangular cross-section of rows and columns for the fiber optic bundle as shown in FIG. 5B, it is understood that the bundle 30 may take upon any cross-sectional shape so long as the cross-sectional area of the bundle 30 exceeds by a fair margin the outer boundaries of the arrays 22 and 26 as shown by the exemplary illustration of FIG. 1. In this manner, the fiber optic bundle 30 may be conveniently disposed between and cover the arrays 22 and 26 without precise alignment.

Figure 2:
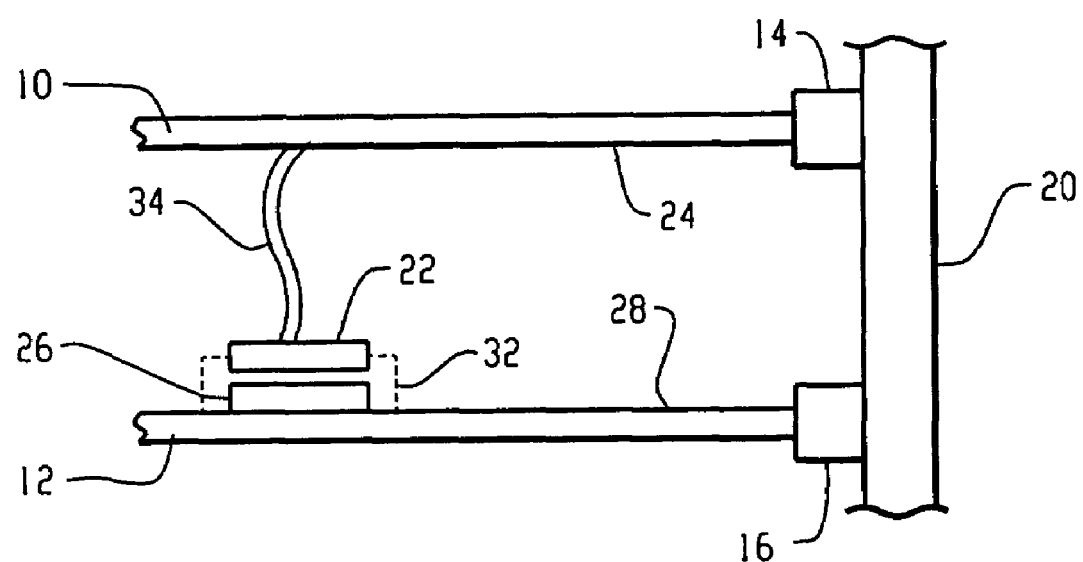
FIG. 2 is an illustration of an alternate data processing system embodiment suitable for application of the present invention.

FIG. 2 is an illustration of an alternate data processing system embodiment suitable for application of the present invention in which the cable of optical fibers 30 is eliminated. Referring to FIG. 2, the array 22 may be brought in close proximity and rough alignment with array 26 through use of a suitable mechanical fixture 32. In the present embodiment, fixture 32 supports array 22 spaced apart from array 26 by only a fraction of an inch, preferably a few thousands of an inch, for example, when the boards 10 and 12 are connected to the backplane 20. The elements of array 22 may be electrically connected to the circuitry of the PC board 10 through a wiring cable 34 which may be held in place by the fixture 32.

It is preferable that the number of optical elements of one array be denser and greater in number than the optical elements of the other array to accommodate a rough alignment thereof. As shown by way of example in FIG. 5, the detectors of array 26, represented by clear circles, are denser and greater in number than the emitters of array 22 represented by darkened circles. Accordingly, in a rough alignment of the arrays as exemplified in FIG. 5, it is more probable that a light beam of an emitter of the array 22 may be transmitted over the free-space between arrays and be received by one or more than one of the detectors of the array 26. Of course, the probability of light reception by at least one of the detectors is commensurate with the relationship of the number of elements between the arrays. While the present example illustrates light detectors denser and greater in number than the light emitters, it is understood that the reverse of this arrangement also falls within the scope of the present invention.

Figure 6:
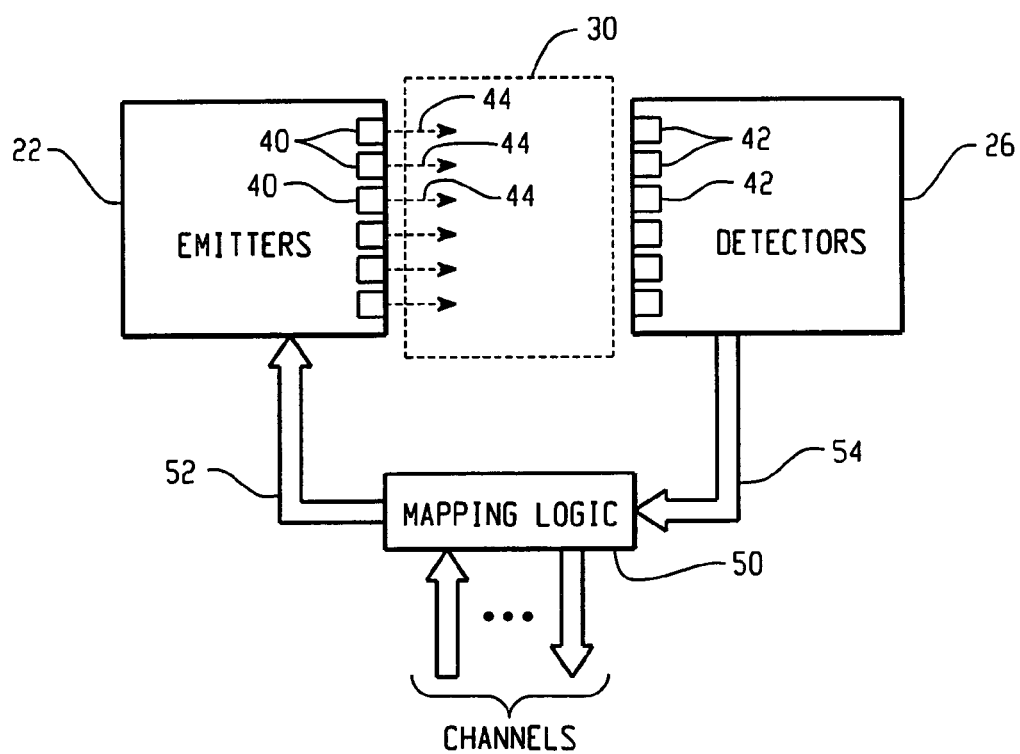
FIG. 6 is a block diagram schematic of an exemplary system for self-configuring optical communication channels between arrays of emitters and detectors suitable for embodying the principles of the present invention.

Once rough alignment between arrays 22 and 26 is achieved in either of the embodiments of FIG. 1 or 2, optical communication channels may be self-configured by mapping emitters of array 22 to detectors of array 26 which will be described now in connection with the embodiment depicted by the block diagram schematic of FIG. 6. Referring to FIG. 6, the arrays of light emitters and light detectors are denoted by the blocks 22 and 26, respectively, and for the embodiment of FIG. 1, the bundle of optical fibers is denoted by the dashed line block 30 disposed between the blocks 22 and 26. It is understood that the cable 30 may be removed as described in connection with the embodiment of FIG. 2 and the arrays 22 and 26 supported in close proximity to each other to communicate optically over the free-space therebetween.

In FIG. 6, the sub-blocks 40 within the array block 22 represent individual light emitters of the array 22 and the sub-blocks 42 within the array block 26 represent individual light detectors of the array 26. Accordingly, when the light emitters 40 of array 22 are individually energized, they emit light beams of optical data denoted by the arrowed lines 44 which are either conducted through the optical fiber bundle 30 or transmitted through free-space and received by the light detectors 42 of array 26. In the present embodiment, a logic controller 50 which may comprise a programmed processor, for example, is provided for optical channel self-configuration as will become more evident from the following description. The controller 50 functions as self-configuring or mapping logic to establish light emitter/detector pairs for optical data communication channels for wide bandwidth board-to-board communication.

The controller 50 may be coupled by signal lines 52 to each of the individual emitters 40 of the array 22 for the electrical energization thereof and similarly, may be coupled by signal lines 54 to each of the individual detectors 42 of the array 26. Thus, the controller 50 may selectively control the energization of each of the emitters 40 individually to emit optical data either through the optical fiber bundle 30 or free-space, and may selectively monitor the detectors 42 and determine which detectors 42 receive the emitted optical data light and the magnitude of light received by each. Accordingly, the controller 50 may map an appropriate detector for each emitter to self-configure optical communication channels between the arrays 22 and 26 using a suitable algorithm which may be programmed therein and executed thereby. It is understood that not all of the emitters 40 of the array 22 may be mapped to a detector 42 and thus, the number of communication channels configured by controller 50 may be less than the number of emitters 40 in the array 22. Once the mapping process is complete, the mapped emitter/detector pairs may be used as optical data communication channels for unidirectional data transfers from board 10 to board 12.

Figure 7:
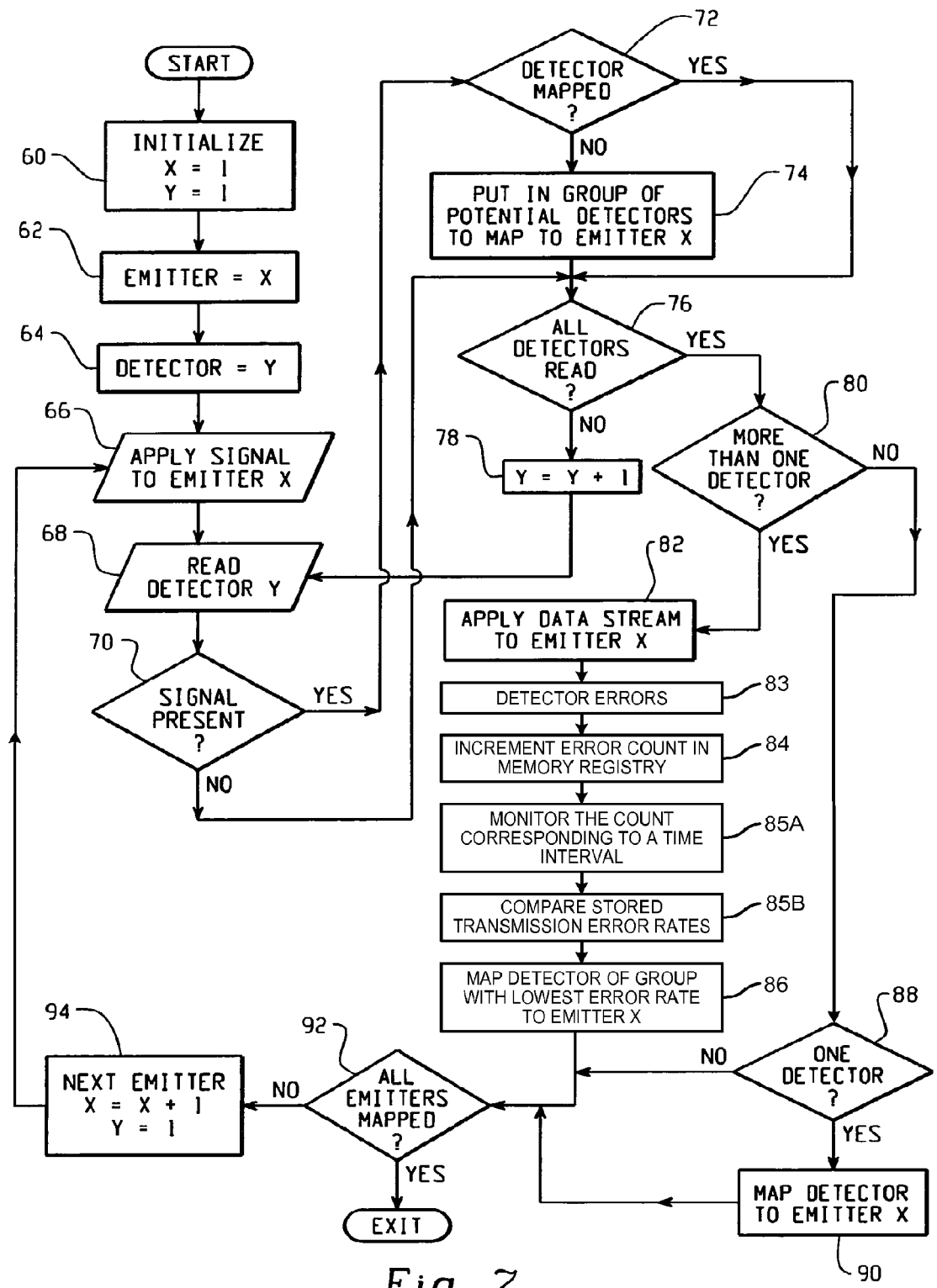
FIG. 7 is a flowchart of an exemplary process for self-configuring optical communication channels suitable for use in the embodiment of FIG. 6.

A suitable algorithm for use by the programmed controller 50 in self-configuring the optical channels is shown in the flowchart of FIG. 7. Each block of the flowchart represents one or more steps of the algorithm. Referring to the flowchart of FIG. 7, the self-configuration process starts at step 60 wherein an initialization process is performed. As part of the initialization, the emitters 40 and detectors 42 may be numbered consecutively in some convenient manner. For example, if the emitters 40 are formed in rows and columns as shown by the example of FIG. 3, then the emitters 40 may be numbered consecutively from left to right starting with the top or first row and descending row to row to the bottom or last row.

Figure 3:
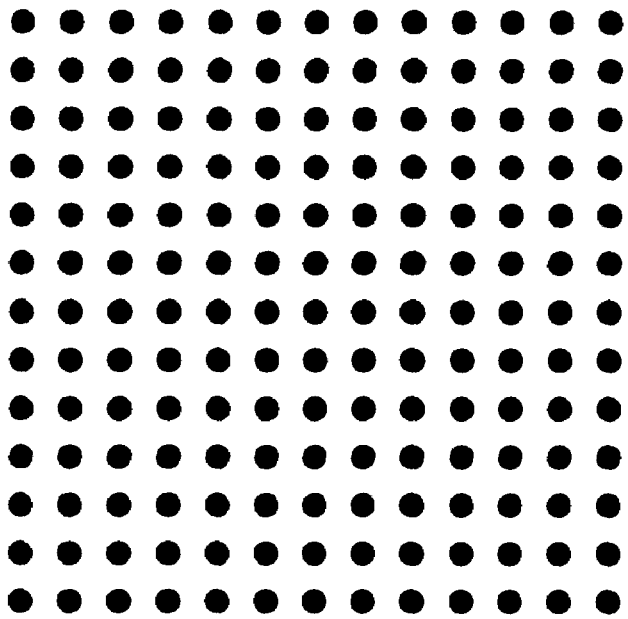
FIG. 3 is an illustration of an exemplary array of light emitters suitable for use in the embodiments of FIGS. 1 and 2.
Figure 4:
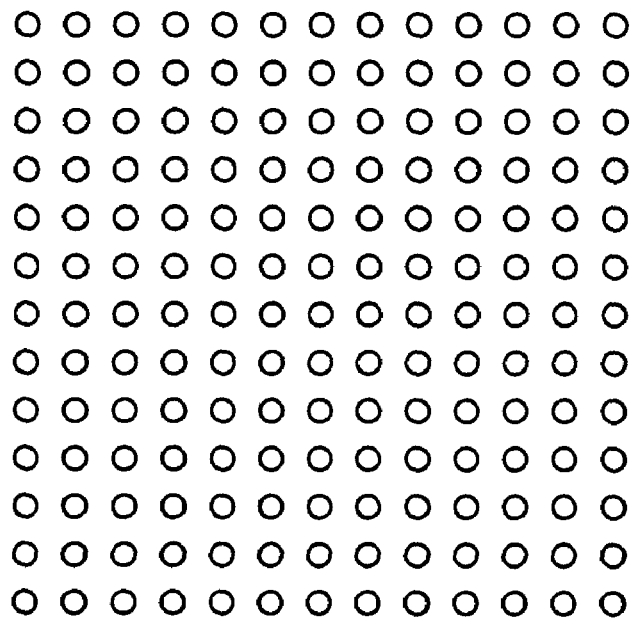
FIG. 4 is an illustration of an exemplary array of light detectors suitable for use in the embodiments of FIGS. 1 and 2.

Since there are 13 rows and 13 columns in the emitter array example of FIG. 3, the emitter in the upper most left hand corner of the array will be numbered 1 and the emitter in the lower most right hand corner will be numbered 169. The same numbering process may be performed by block 60 for the detectors 42 which are also in rows and columns, but may be denser and in greater number than the emitters 40 as shown by FIG. 5. Also in block 60, the process may set the starting emitter number X and detector number Y to one.

In the next blocks 62 and 64, the emitter of array 22 and corresponding signal line of lines 52 associated with the number X and the detector of array 26 and corresponding signal line of lines 54 associated with the number Y are selected initially for processing. In block 66, a signal is applied by processor 50 over the corresponding signal line to emitter X (energization) to cause emitter X to generate a light beam either through the optical fiber bundle 30 or over free-space. The magnitude of light received by detector Y is read in over the corresponding signal line to the processor 50 in block 68. Next, in block 70, it is determined whether or not an appropriate light signal is present at detector Y. This may be accomplished in the present embodiment by comparing the light magnitude of detector Y to a minimum threshold.

If the light value of detector Y exceeds the minimum threshold, then execution continues at block 72 wherein it is determined if detector Y has already been mapped to an emitter. If not, the detector Y is added to a group of potential detectors to map to emitter X in block 74. The associated detector number Y may be stored in a designated register of a memory of processor 50. The memory of processor 50 may include a set of registers correspondingly designated to the emitters of array 22 into which may be stored the detector numbers Y of the potential mapping group.

If the light value of detector Y does not exceed the minimum threshold, the processing bypasses the blocks of 72 and 74 and continues at block 76. Likewise, if it is determined that the detector Y was previously mapped to an emitter in block 72, then execution of block 74 is circumvented to block 76 wherein the processor determines if all of the detectors of array 26 have been read. If not, the process increments the detector number Y by one in block 78 and repeats blocks 68-76 for detector Y+1. The process continues to cycle through blocks 68-78 until all of the detectors of array 26 have been read and the group of potential detectors to map to emitter X is determined and stored in the designated registers for emitter X.

In the next block 80, it is determined if there are more than one detector in the group. If so, then a predetermined data stream is applied to emitter X in block 82 to generate optical data transmission from emitter X. During the application of the data stream, the detectors of the determined group are monitored for reception of the predetermined optical data transmission by the processor 50 to determine a transmission error rate for each detector of the group. This may be accomplished in the present embodiment through use of conventional error detection and correction (EDAC) techniques. For example, each time an error is detected in the optical data transmission received by a detector of the group in block 83, an error count in a designated memory register for that detector is incremented in block 84. Thus, a transmission error rate may be determined by monitoring differences in count corresponding to predetermined intervals of time in block 85A.

Once a transmission error rate is determined for each detector of the group, then, in block 86, the processor 50 maps the emitter X to a detector of the group based on its determined error rate. In the present embodiment, the stored transmission error rates of the detectors are compared with each other in block 85B to determine the light detector with the lowest error rate which is selected for mapping to emitter X. If the decision of block 80 is negative, it is next determined in block 88 if there is only one detector in the group. If so, then the emitter X is mapped to the one detector of the group in block 90. If there are no detectors in the group as determined by block 88, then the emitter X may remain unmapped. That is, there will be no optical communication channel configured by the present embodiment for emitter X. Otherwise, emitter X is mapped to the selected detector in either block 86 or 90 to form a light emitter/detector pair of an optical communication channel and the selected detector is designated as being mapped.

Thereafter, in block 92, it is determined if all of the emitters of the array 22 were mapped. If not, the next emitter in consecutive order X=X+1 is selected for signal application and the detector number is reset to one in block 94. Then, the steps of blocks 66 through 94 are repeated for each emitter in the array 22. This self-configuration process will continue for all of the emitters in the array 22 whereupon a complete mapping of optical communication channels for the arrays 22 and 26 via optical fiber bundle 30 or free-space is established. Then, the process will exit via block 92.

Figure 8:
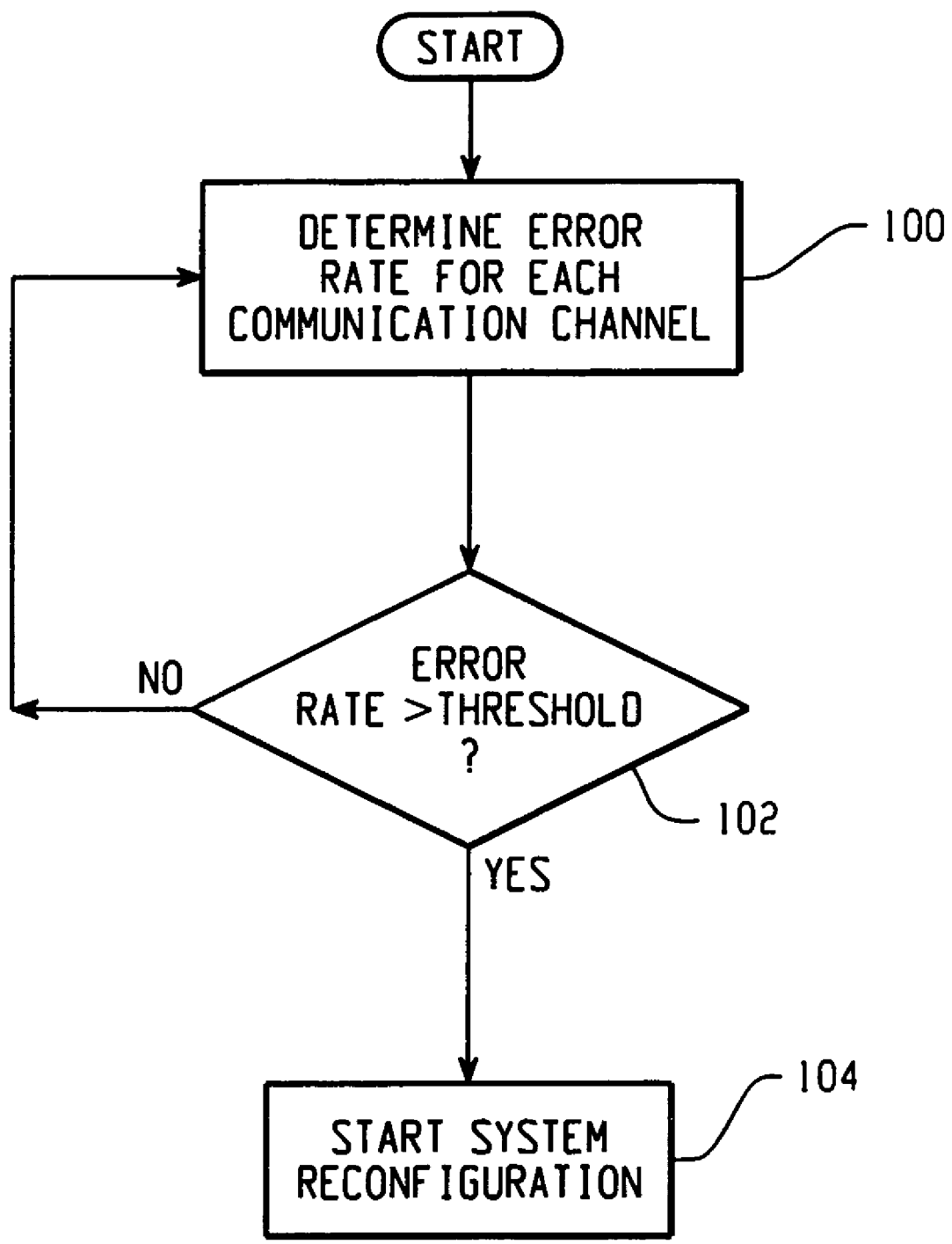
FIG. 8 is a flowchart of an exemplary process for reconfiguring optical communication channels suitable for use with the embodiment of FIG. 6.

Once the self-configuration process is complete, board-to-board data communication over the established optical communication channels may commence. During normal system operation, it may be determined dynamically when to reconfigure the optical communication channels. In the present embodiment, this dynamic reconfiguration process is achieved through use of method steps shown by way of example in the flowchart of FIG. 8. Referring to FIG. 8, the reconfiguration method starts at block 100 wherein a transmission error rate is established for each optical channel. This may be accomplished in the present embodiment through use of conventional error detection and correction (EDAC) techniques. For example, each time a transmission error is detected in a channel, an error count in a designated memory register for that channel is incremented.

Thus, an error rate may be determined by monitoring differences in count corresponding to predetermined intervals of time. When an error rate for a channel is determined to exceed a predetermined threshold by block 102, then the process initiates a channel reconfiguration in block 104 which may be accomplished by re-executing the flowchart of FIG. 7, for example. The reconfiguration process of FIG. 8 will continue to measure and monitor the error rates of the optical channels in block 100, if no channel exhibits an excessive error rate. Also, once a channel reconfiguration initiated by block 104 is complete, the process will continue at block 100.

While the self-configuration process exemplified by the flowchart of FIG. 7 sought a detector from array 26 for each emitter of array 22 with the detectors of array 26 being denser and in greater number than the emitters of array 22, it is understood that the reverse of this process is an alternate suitable embodiment of the present invention. For example, the emitters of array 22 may be made denser and in greater number than the detectors of array 26. If FIG. 5 is used as an example of this alternate embodiment, then the darkened circles are representative of the detectors and the clear circles are representative of the emitters and the self-configuration process will find an emitter of the array 22 for each detector of the array 26.

For this alternate embodiment, the self-configuration process may start with a detector of the array and find a group of potential emitters for mapping to the detector. Then, a potential emitter of the group may be mapped to the detector based on the determined optical data transmission error rates of the emitters of the group. The process will continue until all of the detectors have been mapped whereupon a complete mapping of optical communication channels for the arrays 22 and 26 via optical fiber bundle 30 or free-space is established.

While the present embodiment has been described in connection with unidirectional board-to-board data communication between arrays 22 and 26 via optical fiber bundle 30 or free-space, it is understood that the same principles may apply to bidirectional board-to-board data communication by electrically connecting another array of electro-optic elements or light emitters to the circuitry of board 12 and an array of opto-electric elements or light detectors to the circuitry of board 10. The optical communication channels for data communication from board 12 to board 10 may be configured and dynamically reconfigured through use of the additional arrays in a similar process as that described herein above in connection with the embodiments of FIGS. 6, 7 and 8, for example. Thus, once configuration of the optical channels of the added arrays are established, then bidirectional data communications between boards 10 and 12 may commence using the established optical communication channels for each direction.

While the various novel aspects of the present invention have been described herein above in connection with one or more embodiments, it is understood that this was done merely to present the invention by way of example. Accordingly, the present invention should not be limited to any single embodiment, but rather construed in breadth and broad scope in accordance with the claims appended hereto.

What is claimed is:

1. A system for self-configuring optical communication channels between arrays of emitters and detectors, said system comprising:
    an array of light emitters;
    an array of light detectors roughly aligned with said array of light emitters; and
    self-configuration logic for controlling the light emitters to transmit optical data to said light detectors and for monitoring received optical data of the light detectors to establish light emitter/detector optical channels between said light emitters and light detectors based on optical data transmission error rates; said logic comprising:
        logic for identifying a group of light detectors for each energized light emitter based on light received from said energized light emitter;
        logic for optically transmitting a predetermined data stream from an emitter to each light detector in the group and determining an optical data transmission error rate from the predetermined data stream for each detector of the group; wherein the logic for determining an optical data transmission error rate comprises logic for incrementing an error count in a designated memory register for each detector of the group of light detectors.

2. The system of claim 1 wherein the emitter array and detector array are electrically connected to circuitry of a first printed circuit board and circuitry of a second printed circuit board, respectively.

3. The system of claim 2 wherein the emitter array is disposed at the first printed circuit board and the detector array is disposed at the second circuit board; and including a cable of optical fibers disposed between the emitter and detector arrays for conducting the optical data from the emitter array to the detector array.

4. The system of claim 2 wherein the emitter array is supported in close proximity to the detector array which receives optical data from the emitter array over the free-space region between the emitter and detector arrays.

5. The system of claim 1 wherein the number of detectors of the detector array is greater than the number of emitters of the emitter array; and wherein the self-configuration logic comprises: logic for selectively energizing light emitters of the emitter array to transmit optical data to the array of light detectors; and logic for mapping a light detector of the detector array to each energized light emitter based on transmission error rates of the optical data received by the light detectors of the detector array.

6. The system of claim 5 wherein the mapping logic comprises: logic for determining an optical data transmission error rate for each detector of each group; and logic for determining a light detector of each group based said determined optical data transmission error rates thereof.

7. The system of claim 6 wherein the mapping logic includes logic for mapping a light detector of each group having the lowest optical data transmission error rate to the corresponding emitter of the emitter array.

8. The system of claim 1 wherein the number of emitters of the emitter array is greater than the number of detectors of the detector array; and wherein the self-configuration logic comprises: logic for selectively monitoring the detectors of the detector array; logic for selectively energizing light emitters of the emitter array to transmit optical data to the array of light detectors; and logic for mapping a light emitter of the emitter array to each monitored light detector based on transmission error rates of the optical data received by the monitored light detectors of the detector array.

9. The system of claim 8 wherein the mapping logic comprises: logic for identifying a group of light emitters of the light emitter array for each monitored light detector based on light received from said selectively energized light emitters; logic for determining an optical data transmission error rate for each emitter of each group; and logic for determining a light emitter of each group based said determined optical data transmission error rates thereof.

10. The system of claim 9 wherein the mapping logic includes logic for mapping a light emitter of each group having the lowest optical data transmission error rate to the corresponding light detector of the detector array.

11. The system of claim 1 including: logic for measuring optical data transmission error rates of the light emitter/detector channels; and logic for reconfiguring the channel configuration based on the measured data error rates of the light emitter/detector channels.

12. The system of claim 11 wherein the reconfiguring logic based on the measured data error rate includes logic for reconfiguring the channel configuration when the measured error rate thereof of a channel exceeds a predetermined threshold level.

13. A method of self-configuring optical communication channels between arrays of emitters and detectors, said method comprising the steps of:
    roughly aligning an array of light emitters to an array of light detectors;
    controlling the light emitters of said emitter array to transmit optical data to said array of light detectors; and
    monitoring received optical data of the light detectors of said detector array to establish light emitter/detector optical channels between said arrays of light emitters and light detectors based on optical data transmission error rates;
    wherein said monitoring comprises identifying a group of light detectors for each energized light emitter based on light received from said energized light emitter; and
    wherein said step of controlling comprises optically transmitting a predetermined data stream from an emitter to each light detector and determining an optical data transmission error rate from the predetermined data stream for each detector of the group; and
    wherein said step of determining an optical data transmission error rate comprises incrementing an error count in a designated memory register for each detector of the group of light detectors.

14. The method of claim 13 including the steps of: configuring the number of detectors of the detector array to be greater than the number of emitters of the emitter array; selectively energizing light emitters of the emitter array to transmit optical data to the array of light detectors; and mapping a light detector of the detector array to each energized light emitter based on transmission error rates of the optical data received by the light detectors of the detector array.

15. The method of claim 14 wherein the step of mapping comprises: determining an optical data transmission error rate for each detector of each group; and determining a light detector of each group based said determined optical data transmission error rates thereof.

16. The method of claim 15 wherein the step of mapping includes mapping a light detector of each group having the lowest optical data transmission error rate to the corresponding emitter of the emitter array.

17. The method of claim 13 including the steps of: configuring the number of emitters of the emitter array to be greater than the number of detectors of the detector array; selectively monitoring the detectors of the detector array; selectively energizing light emitters of the emitter array to transmit optical data to the array of light detectors; and mapping a light emitter of the emitter array to each monitored light detector based on transmission error rates of the optical data received by the monitored light detectors of the detector array.

18. The method of claim 17 wherein the step of mapping comprises: determining an optical data transmission error rate for each emitter of each group; and determining a light emitter of each group based said determined optical data transmission error rates thereof.

19. The method of claim 18 wherein the step of mapping includes mapping a light emitter of each group having the lowest optical data transmission error rate to the corresponding light detector of the detector array.

20. The method of claim 13 including the steps of: measuring optical data transmission error rates of the light emitter/detector channels; and reconfiguring the channel configuration based on the measured data error rates of the light emitter/detector channels.

21. The method of claim 20 the channel configuration is reconfigured when the measured error rate of a channel exceeds a predetermined threshold level.

22. A system for self-configuring optical communication channels, said system comprising:
    first means for emitting light in an array of light beams;
    second means for detecting said array of light beams, said second means being roughly aligned with said array of light beams; and
    self-configuration means for controlling said first means to transmit optical data in said array of light beams and for monitoring said second means for received optical data in said array of light beams to establish optical channels between said first and second means based on optical data transmission error rates; said configuration means comprising:
    means for identifying a group of light detectors for each energized light emitter based on light received from said energized light emitter;
    means for optically transmitting a predetermined data stream from an emitter to each light detector and determining an optical data transmission error rate from the predetermined data stream for each detector of the group;
    means for incrementing an error count in a designated memory register for each detector of the group of light detectors;
    means for monitoring the count corresponding to a time interval; and
    means for comparing the transmission error rate of each detector to determine the detector with the lowest transmission error rate over the time interval.

* * * * *